United States Patent
Charles

(10) Patent No.: US 12,450,139 B1
(45) Date of Patent: Oct. 21, 2025

(54) DYNAMIC TRAFFIC PATTERN ANALYSIS AND RATE-LIMIT ADJUSTMENT

(71) Applicant: Citibank, N.A., New York, NY (US)

(72) Inventor: David Charles, Irving, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/059,085

(22) Filed: Feb. 20, 2025

(51) Int. Cl.
*G06F 11/30* (2006.01)
*G06F 11/32* (2006.01)

(52) U.S. Cl.
CPC ........ *G06F 11/3051* (2013.01); *G06F 11/324* (2013.01)

(58) Field of Classification Search
CPC .......................... G06F 11/3051; G06F 11/324
See application file for complete search history.

(56) References Cited

U.S. PATENT DOCUMENTS

| | | | | |
|---|---|---|---|---|
| 2023/0259408 A1* | 8/2023 | Grushka | ................. | G06F 9/505 718/105 |
| 2023/0334310 A1* | 10/2023 | Manuel-Devadoss | ....................... | H04L 63/1441 |
| 2024/0004711 A1* | 1/2024 | Young, Jr. | ............. | G06F 9/5005 |
| 2025/0077543 A1* | 3/2025 | Beaulieu | ............... | G06F 40/109 |
| 2025/0123964 A1* | 4/2025 | Fico | ........................ | G06F 9/451 |
| 2025/0126068 A1* | 4/2025 | Chitta | ..................... | H04L 47/20 |

OTHER PUBLICATIONS

A. El Malki, U. Zdun and C. Pautasso, "Impact of API Rate Limit on Reliability of Microservices-Based Architectures," 2022 IEEE International Conference on Service-Oriented System Engineering (SOSE), Newark, CA, USA, 2022, pp. 19-28, doi: 10.1109/SOSE55356.2022.00009. (Year: 2022).*

\* cited by examiner

*Primary Examiner* — Eric T Oberly
(74) *Attorney, Agent, or Firm* — Perkins Coie LLP

(57) ABSTRACT

Systems and methods for dynamically managing application programming interface (API) resource allocation and rate limits are disclosed herein. An API monitoring system receives usage monitoring data for APIs, where each API is associated with a corresponding rate limit. A machine learning model processes the usage monitoring data to predict time periods when API usage is expected to exceed rate limits. Based on determining that a matching time period has been predicted for a subset of oversubscribed APIs, the system retrieves resource allocation data and identifies undersubscribed APIs from which resources may be reallocated. The system dynamically adjusts memory, processing power, or network bandwidth allocations and updates corresponding rate limits to balance API demand. By proactively reallocating resources and adjusting rate limits, the system optimizes API performance, prevents failures, and ensures efficient utilization of computing resources.

19 Claims, 8 Drawing Sheets

300

303 306 309

| API_ID | Predicted Time | Rate (req/sec) |
|---|---|---|
| A001 | Sunday 8PM – 11PM | 2000 |
| A002 | Monday 5PM – 10PM | 1500 |

FIG. 3

| API_ID | Memory (MB) | Processor (GHz) | Network (Mbps) |
|--------|-------------|-----------------|----------------|
| A001 | 8000 | 3.5 | 1000 |
| A002 | 4000 | 2.0 | 500 |
| A003 | 2000 | 1.5 | 300 |

FIG. 4

| API_ID | Resource Type | Previous Allocation | Updated Allocation | Previous Rate Limit | Updated Rate Limit |
|---|---|---|---|---|---|
| A001 | Memory (MB) | 8000 | 10000 | 2000 | 2500 |
| A001 | Processor (GHz) | 3.5 | 4.0 | - | - |
| A001 | Network (Mbps) | 1000 | 1200 | - | - |
| A002 | Memory (MB) | 4000 | 3000 | 1500 | 1400 |
| A003 | Memory (MB) | 2000 | 1000 | 1200 | 1100 |

FIG. 5

DYNAMIC TRAFFIC PATTERN ANALYSIS AND RATE-LIMIT ADJUSTMENT

SUMMARY

Computing systems often must interoperate and communicate with each other. To do so, these systems may use application programming interfaces (APIs) to send and receive data. APIs rely on hardware and resources that are finite in order to function. Accordingly, system operators monitor the usage of APIs and may restrict usage when necessary, for example, based on resource availability. When use of an API is required but the API is not permitted to operate based on resource availability, applications and processes depending on the API may fail. While conventional systems rely on static thresholds and manual interventions to prevent resource contention, such approaches are inefficient and reactive rather than proactive.

To address these challenges, methods and systems are disclosed herein for using machine learning (also known as "ML") to predict when APIs will not be accessible based on resource constraints and to reallocate resources to prevent performance degradation. In particular, methods and systems disclosed herein may address these challenges using an API monitoring system. The API monitoring system may receive usage monitoring data for APIs. Each API may be associated with a corresponding rate limit, for example, to ensure that underlying systems do not run out of resources when the APIs are used. The usage monitoring data may include timing data and access metrics for the APIs. For example, the usage monitoring data may include a number of times a particular API (or a function of a particular API) was called during a time interval (e.g., a one-hour period). In another example, the usage monitoring data may include a size of the data that was requested or returned by the API (or one or more functions of the API) during a particular time period. In another example, the API monitoring system may receive API events with corresponding timestamps. The API monitoring system may then generate, from usage monitoring data, streamlined data to be input into a machine learning model.

The API monitoring system may use the machine learning model to predict future resource consumption (e.g., overconsumption). In particular, the API monitoring system may input the usage monitoring data into the machine learning model to obtain time periods when a corresponding usage rate for APIs is predicted to exceed the corresponding rate limit. The machine learning model may be one that has been trained, using training data, to predict time periods when usage rates exceed rate limits. For example, the machine learning model may output multiple one-hour intervals when one or more particular APIs are predicted to be used more than a threshold number of times within a particular time interval (e.g., within one hour, thirty minutes, fifteen minutes, etc.).

The API monitoring system may then determine (e.g., based on the output of the machine learning model) a number of oversubscribed interfaces for a particular time period. In particular, the API monitoring system may determine that a matching time period has been output by the machine learning model for a subset of oversubscribed APIs. The matching time period may indicate that each oversubscribed API of the subset is predicted to exceed the corresponding rate limit during the same time period. For example, the API monitoring system may determine that the same hour interval has been output by the machine learning model for two different APIs, indicating that those APIs will be oversubscribed during the same time period. In some embodiments, the machine learning model may also output the metrics indicating the oversubscription amount for each API.

The API monitoring system may then determine various resources being used or allocated to the APIs. In particular, the API monitoring system may, based on determining that the matching time period has been output by the machine learning model for the subset of oversubscribed APIs, retrieve resource allocation data for the APIs. In some embodiments, the resource allocation data may include allocation data for processing resources, memory resources, or network resources. For example, the resource allocation data may determine that a particular amount of memory or a particular amount of processing power has been allocated to each interface. In some embodiments, the resource allocation data may indicate how many resources each API is predicted to use at the time when oversubscription occurs.

The API monitoring system may then adjust resource allocations and limits to fix the oversubscription. In particular, the API monitoring system may determine, based on the resource allocation data, one or more undersubscribed APIs from which resources may be reallocated for the subset of oversubscribed APIs. In some embodiments, the API monitoring system may compare allocations with projected usage for each API to determine which APIs are undersubscribed. In some embodiments, the API monitoring system may compare the predicted usage of each API with a limit set for each API.

The API monitoring system may then reallocate the resources to the subset of oversubscribed APIs from, for example, undersubscribed APIs. In some embodiments, the API monitoring system may increase the rate limits for the subset of oversubscribed APIs for the matching time period. In some embodiments, the API monitoring system may allocate, for example, memory resources, processing resources, or network resources from undersubscribed APIs to the oversubscribed APIs. In some embodiments, the API monitoring system may update corresponding rate limits for the subset of oversubscribed APIs to increase the corresponding rate limits. For example, if a particular undersubscribed interface is twenty percent undersubscribed, the API monitoring system may decrease the limit to be around twenty percent lower so that the resources of the underlying system can be used more efficiently.

In some embodiments, the API monitoring system may use artificial intelligence explainability to explain, for example, to an operator why the oversubscription is predicted to occur. For example, the API monitoring system may input the matching time period and the usage monitoring data into an explainability model with a first prompt to cause the explainability model to identify a subset of the usage monitoring data that affects a prediction of the matching time period. The usage monitoring data may include processor usage, memory usage, or network usage. For example, the explainability model may determine which fields within the input data most significantly affect the prediction that an API will be oversubscribed. For example, memory usage and processor usage may have field values that most significantly affected the oversubscription prediction.

In some embodiments, the API monitoring system may then input the explainability results into a generative artificial intelligence model (e.g., a large language model (LLM)) to report the results to an operator. In particular, the API monitoring system may input the subset of the usage monitoring data into an LLM with a second prompt to cause the LLM to generate a natural language output indicating a reason for the subset of oversubscribed APIs. Once the LLM returns the output of the prompt, the API monitoring system may generate for display (e.g., for an operator) the natural language output.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 illustrates an example table representing predicted oversubscription periods for APIs, in accordance with one or more embodiments of this disclosure.

FIG. 4 illustrates an example table representing resource allocation data for APIs, in accordance with one or more embodiments of this disclosure.

FIG. 5 illustrates an example table representing resource reallocation and rate limit adjustments for APIs, in accordance with one or more embodiments of this disclosure.

DETAILED DESCRIPTION

Figure 1:
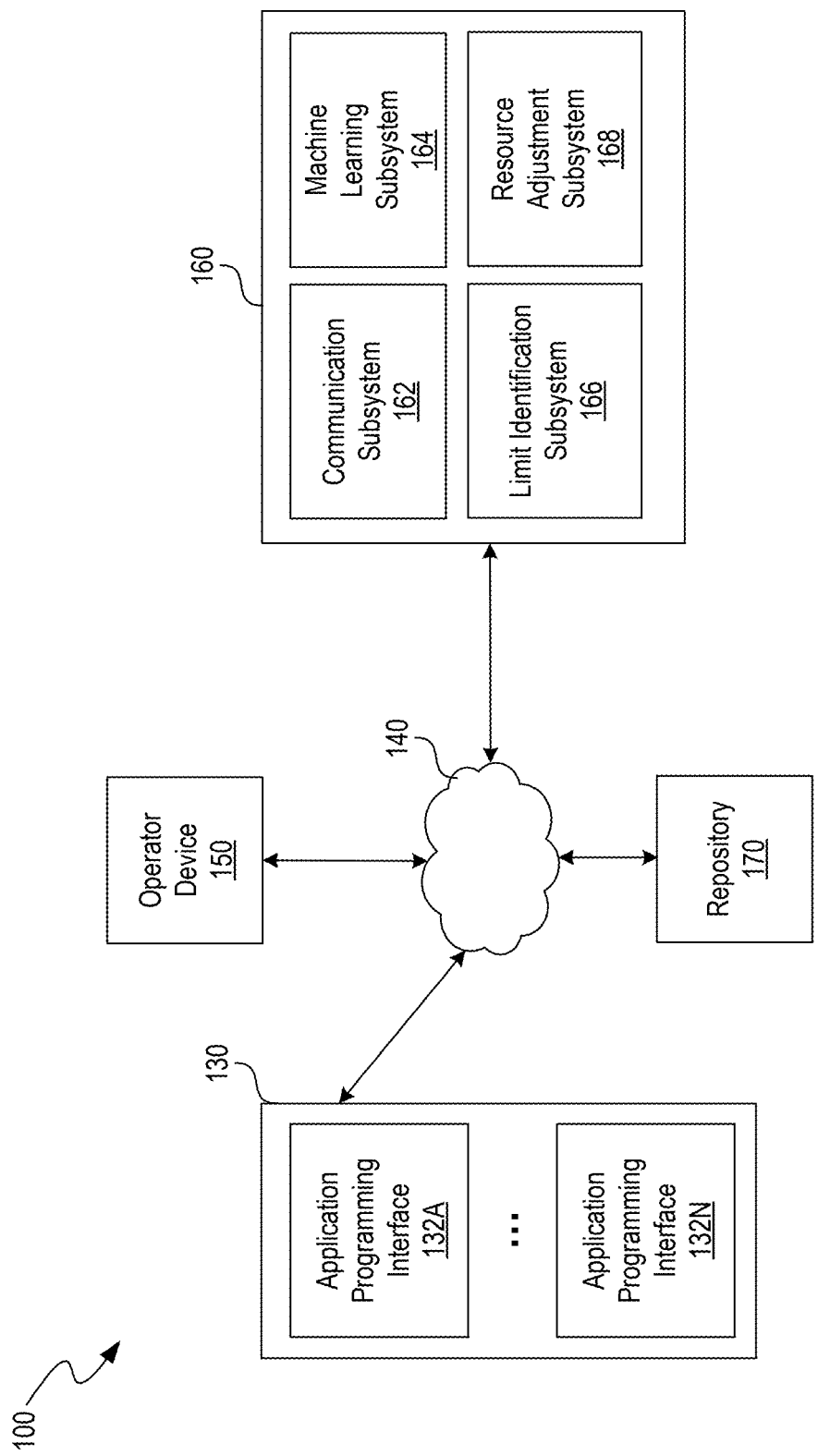
FIG. 1 shows an illustrative system for monitoring and dynamically adjusting resource allocations and rate limits based on predicted oversubscription events, in accordance with one or more embodiments of this disclosure.

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

The disclosed technology provides a system and method for dynamically managing API usage to prevent oversubscription and optimize resource allocation. The API monitoring system may be configured to receive usage monitoring data for a plurality of APIs. The usage monitoring data may include metrics such as request rates, data sizes, and timing intervals. The usage monitoring data may be input into a machine learning model that may be trained to predict time periods during which usage rates for one or more APIs may exceed predefined rate limits due to resource constraints, such as memory, processing power, or network bandwidth constraints. Oversubscribed APIs are APIs predicted to exceed the allocated rate limits or resource capacity (e.g., processing power, memory, or network bandwidth) during a specific time period, which may lead to service degradation.

Based on predictions of oversubscription events, the API monitoring system may retrieve resource allocation data associated with the plurality of APIs. The resource allocation data may indicate the current distribution of resources, including memory resources, processing resources, and network resources, across the monitored APIs. The API monitoring system may analyze the resource allocation data to identify one or more APIs that may be undersubscribed and operating below their assigned resource capacities. The API monitoring system may reallocate unused resources from the undersubscribed APIs to the oversubscribed APIs to address the predicted resource demands. In some embodiments, the API monitoring system may dynamically adjust rate limits for the oversubscribed APIs during the affected time periods, which may help ensure continued operation without degradation of service. Undersubscribed APIs are APIs operating below the allocated resource capacity, which may allow the undersubscribed APIs to have excess available resources (e.g., unused memory, processing power, or network bandwidth) that can be reallocated to oversubscribed APIs to prevent system degradation.

The API monitoring system may incorporate an explainability model to analyze factors contributing to the prediction of oversubscription events. The explainability model may identify usage metrics, such as processor usage or memory consumption, that may significantly impact the prediction. The API monitoring system may use the results of the explainability model as input to a generative artificial intelligence model to generate a natural language explanation. For example, the API monitoring system may generate a report for an operator describing the primary factors contributing to a predicted oversubscription event and the steps taken to address it. This process may improve transparency and provide operators with actionable insights.

By monitoring API usage patterns, predicting oversubscription events, reallocating resources dynamically, and providing explainable insights, the disclosed technology may enable efficient management of API resources. The API monitoring system may reduce or prevent service disruptions and allow for improved API performance during periods of high demand, such as those caused by viral events or unexpected traffic spikes.

For example, an API for a streaming service is designed to handle up to 1,000 requests per second to manage its backend systems' load effectively. However, during a popular event (e.g., the release of a highly anticipated movie or a global live-streamed concert), the number of requests spikes to 1,500 requests per second. The backend systems supporting the API (e.g., servers, memory, bandwidth) cannot process the additional 500 requests per second without degrading performance. Users (e.g., customers accessing the service to purchase tickets) experience issues such as slow response times, timeouts, or errors, leading to a poor user experience. The overload may also affect other APIs or services hosted on the same system, causing a cascading failure where unrelated services become inaccessible. The API monitoring system may identify the oversubscription event by analyzing usage monitoring data, such as API call rates and resource utilization. The machine learning model may predict the API will exceed the 1,000 requests/second rate limit during the event. The API monitoring system may recognize that the memory and processing power allocated to the streaming service API are insufficient to handle the spike (e.g., user requests). The API monitoring system may relocate unused memory and processing power from undersubscribed APIs (e.g., APIs that are handling significantly fewer requests than their limits, such as 200/1,000 requests per second). Alternatively, the API monitoring system may temporarily adjust rate limits for both oversubscribed and undersubscribed APIs to balance the load effectively. The API monitoring system may mitigate the oversubscription event to allow the streaming service API to process all requests without performance degradation.

FIG. 1 shows an illustrative system 100 for monitoring and dynamically adjusting resource allocations and rate limits based on predicted oversubscription events, in accordance with one or more embodiments of this disclosure. For example, the system 100 may be used to predict and mitigate resource oversubscription for APIs, such as excessive request rates, memory allocation exhaustion, or network bandwidth saturation. In some embodiments, the system 100 may utilize a first set of usage monitoring data (e.g., API call rates, data size, timing metrics) to predict potential oversubscription events using a trained machine learning model. The machine learning model may be able to identify specific time periods and APIs that are likely to exceed their rate limits. In cases where the output of the machine learning model shows uncertainty (e.g., incomplete predictions) based on the first set of data, the system can obtain more resource allocation data (e.g., memory, processing power, or network usage) with which to augment the data (e.g., refine the machine learning prediction) and use the augmented data to ascertain whether inefficient API operation exists.

For example, the system 100 may include an API monitoring system 160 able to monitor and predict when one or more APIs will not be accessible based on limit or resource constraints. The API monitoring system 160 may include software, hardware, or a combination of the two. For example, the API monitoring system 160 may be a physical server or a virtual server that is running on a physical computer system. In some embodiments, the API monitoring system 160 may be configured on a user device (e.g., a laptop computer, a smartphone, a desktop computer, an electronic tablet, or another suitable user device) and configured to execute instructions for monitoring and predicting oversubscription. In particular, the API monitoring system 160 may include several subsystems each configured to perform one or more steps of the methods described herein, such as a communication subsystem 162, a machine learning subsystem 164, a limit identification subsystem 166, and a resource adjustment subsystem 168.

As described herein, the API monitoring system 160 may obtain data to determine whether an API usage rate is predicted to exceed a corresponding rate limit. The API monitoring system 160 may receive the data from tool-based monitoring systems such as from a set of tool-based monitoring systems 130 (e.g., including tool-based monitoring system 132A, tool-based monitoring system 132N). As described herein, a tool-based monitoring system may be any system (e.g., computer, device, node, etc.) that is enabled to execute one or more tools for monitoring the functioning at the system externally or enabled to execute tasks for which data may be passively collected.

The API monitoring system 160 may be configured to receive the data via a communication network 140 at the communication subsystem 162. The communication network 140 may be a local area network (LAN), a wide area network (WAN; e.g., the internet), or a combination of the two. The communication subsystem 162 may include software components, hardware components, or a combination of both. For example, the communication subsystem 162 may include a network card (e.g., a wireless network card or a wired network card) that is associated with software to drive the card. The communication subsystem 162 may pass at least a portion of the data, or a pointer to the data in memory, to other subsystems such as the machine learning subsystem 164, the limit identification subsystem 166, and the resource adjustment subsystem 168.

According to some embodiments, the API monitoring system 160 may be able to obtain such data by generating one or more commands that configure the tool-based monitoring systems to execute monitoring operations or testing operations to obtain operational metrics. In some examples, the command(s) may specify a specific timeframe for obtaining the data (e.g., explicitly by identifying the timeframe via a start and an end time, or implicitly by requesting data from a current block of time").

Additionally, the system 100 may include a repository 170, which may store historical API usage data, operational metrics, machine learning model parameters, and system commands. In some embodiments, the repository 170 may store preconfigured commands related to resource reallocation and rate limit adjustments, which may be used by the API monitoring system 160 to manage API performance dynamically. The repository 170 may also include metadata or tags associated with stored data, such as API identifiers, resource allocation policies, or usage trend patterns. The API monitoring system 160 may retrieve data from the repository 170 to refine its predictions, optimize resource distribution, and improve the accuracy of oversubscription event mitigation. Additionally, the repository 170 may store augmented datasets used to update the machine learning model based on newly collected monitoring data, ensuring adaptive and evolving predictions.

The system 100 may further include an operator device 150, which may receive alerts generated by the API monitoring system 160 when an oversubscription event is detected. The operator device 150 may be a desktop computer, mobile device, or other suitable user interface through which an operator may review system notifications and monitor API performance. The API monitoring system 160 may transmit natural language explanations generated by the explainability model to the operator device 150 to provide insight into oversubscription events and system responses.

Figure 2:
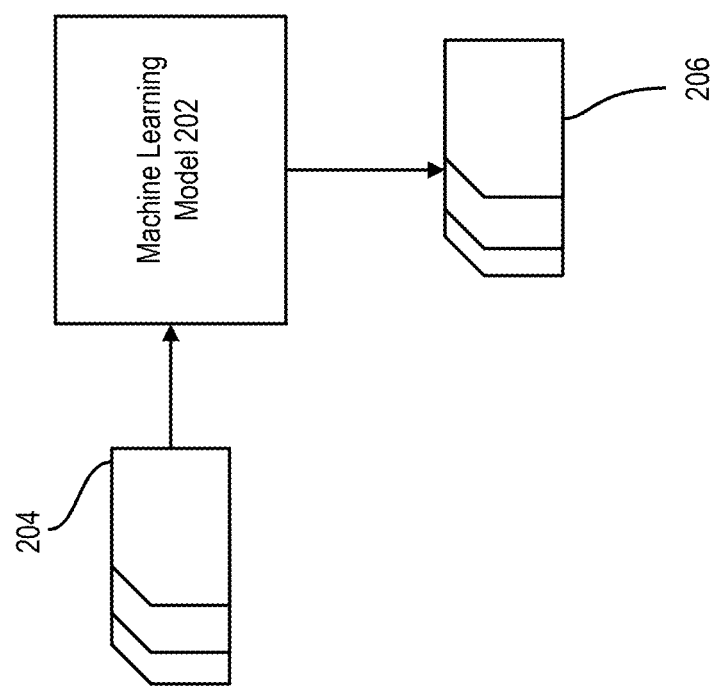
FIG. 2 illustrates an exemplary machine learning model trained to predict API oversubscription events using historical usage data, in accordance with one or more embodiments of this disclosure.

FIG. 2 illustrates an exemplary machine learning model 202 trained to predict API oversubscription events using historical usage data, in accordance with one or more embodiments of this disclosure. The machine learning model 202 may be the API monitoring machine learning model, a temporal API monitoring machine learning model, or another model. According to some examples, the machine learning model may be any model, such as a model for classification. In some embodiments, the machine learning model 202 may be trained to intake input 204, including input data received. As a result of inputting the input 204 into the machine learning model 202, the machine learning model 202 may then output an output 206. As described herein, the input data can include data such as the operational metric dataset, the augmented operational metric dataset, or a vectorized version of either dataset. In particular, the machine learning model 202 may receive, for a plurality of APIs, usage monitoring data. The usage monitoring data may indicate each API of the plurality of APIs is associated with a corresponding rate limit.

For example, the output 206 may include an indication of an API usage condition, such as a label for the type of usage condition (e.g., "rate limit exceeded," "resource contention," etc.) and a degree of the API usage condition, which may be a numerical rating indicating the severity, or may be a classification (e.g., "severe," "moderate," or "low"). Furthermore, as described, the machine learning model 202 may be configured to output a confidence interval or other metric for certainty regarding the other outputs. The machine learning model 202 may have been trained on a training dataset containing a plurality of API usage datasets and labels such as a degree and indication for API usage conditions that were identified by operators. Moreover, the machine learning model 202 may have been trained on usage monitoring data including timing data and access metrics for the plurality of APIs. In some embodiments, the training may consist of inputting the matching time period and the usage monitoring data into the machine learning model 202 with a first prompt to identify a subset of the usage monitoring data that affects a prediction of the matching time period. The usage monitoring data may include one or more of processor usage, memory, usage, or network usage. In another embodiment, the API monitoring system 160 may input the identified subset of usage monitoring data into the machine learning model 202 with a second prompt to instruct the machine learning model 202 to generate a natural language explanation describing the reason for the subset of oversubscribed APIs. The API monitoring system 160 may then generate the natural language output for display to allow operators to view human-readable explanations of oversubscription events and the contributing factors. For example, the machine learning model 202 is described in relation to FIG. 2 herein.

The output parameters may be fed back to the machine learning model 202 as input to train the machine learning model 202 (e.g., alone or in conjunction with user indications of the accuracy of outputs, labels associated with the inputs, or other reference feedback information). The machine learning model 202 may update its configurations (e.g., weights, biases, or other parameters) based on the assessment of its prediction and reference feedback information (e.g., user indication of accuracy, reference labels, or other information). Connection weights may be adjusted, for example, if the machine learning model 202 is a neural network, to reconcile differences between the neural network's prediction and the reference feedback regarding API usage conditions (e.g., predicted oversubscriptions events, resource contention, or exceeded rate limit). In some embodiments, the machine learning model 202 may include an explainability model. The explainability model may be trained to predict, for each usage rate input into the explainability model, a subset of fields from the usage monitoring data that best predict the corresponding usage rate. For example, the explainability model may determine that, for a specific API, memory usage and network bandwidth are the primary contributing factors to oversubscription, while processor usage is less relevant. The API monitoring system 160 may use this information to refine its predictions and resource allocation adjustments more efficiently.

Explainability models are used in machine learning systems to provide transparency into the factors that influence a model's predictions. In traditional machine learning models, decisions are often based on complex, high-dimensional relationships within data, making it difficult to interpret why a particular prediction was made. Explainability models address this issue by identifying key input parameters that contribute to the output, allowing operators to understand, validate, and refine model behavior. Various techniques, such as feature attribution methods (e.g., Shapley values, Integrated Gradients) or surrogate models (e.g., Local Interpretable Model-agnostic Explanations (LIME)), may be employed to generate interpretable insights about how different features impact predictions.

In regard to API monitoring, the explainability model may be used to analyze factors contributing to predicted API oversubscription events. The API monitoring system 160 may input the matching time period and usage monitoring data into the explainability model to determine which parameters—such as processor usage, memory consumption, or network bandwidth—most significantly influence the machine learning model's output. The explainability model may generate an attribution score or ranked list of key features, allowing the system to assess which resource constraints are driving oversubscription. This information may further be used to refine future predictions or improve resource reallocation strategies.

In some embodiments, the API monitoring system 160 may further input the output of the explainability model into a LLM with a second prompt to generate a natural language output describing the reasons for the predicted oversubscription. The natural language output may be displayed to an operator, providing an intuitive summary of which factors contributed to the machine learning model's prediction and any recommended adjustments. By integrating explainability into API usage predictions, the API monitoring system 160 may improve transparency, improve trust in automated decision-making, and allow more effective resource management.

One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions for whether an API usage condition exists, what type of API usage condition it is, the severity, or which API is affected.

In some embodiments, the machine learning model 202 may include an artificial neural network. In such embodiments, the machine learning model 202 may include an input layer and one or more hidden layers. Each neural unit of the machine learning model 202 may be connected to one or more other neural units of the machine learning model 202. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model 202 may be self-learning or trained rather than explicitly programmed and may perform significantly better in certain areas of problem-solving as compared to computer programs that do not use machine learning. During training, an output layer of the machine learning model 202 may correspond to a classification of the machine learning model 202, and an input known to correspond to that classification may be input into an input layer of the machine learning model 202 during training. During testing, an input without a known classification may be input into the input layer, and a determined classification may be output.

The machine learning model 202 may include embedding layers in which each feature of a vector is converted into a dense vector representation. These dense vector representations for each feature may be pooled at one or more subsequent layers to convert the set of embedding vectors into a single vector. The machine learning model 202 may be structured as a factorization machine model. The machine learning model 202 may be a non-linear model or supervised learning model that can perform classification or regression. For example, the machine learning model 202 may be a general-purpose supervised learning algorithm that the API monitoring system 160 uses for both classification and regression tasks. Alternatively, the machine learning model 202 may include a Bayesian model configured to perform variational inference on the graph or vector.

Transformer for Neural Network

To assist in understanding the present disclosure, some concepts relevant to neural networks and machine learning are discussed herein. Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, or other such possible connections between neurons or layers, which are not discussed in detail here.

A deep neural network (DNN) is a type of neural network having multiple layers or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as machine learning-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "machine learning-based model" or more simply "machine learning model" may be understood to refer to a DNN. Training a machine learning model refers to a process of learning the values of the parameters (or weights) of the neurons in the layers such that the machine learning model is able to model the target behavior to a desired degree of accuracy. Training typically requires the use of a training dataset, which is a set of data that is relevant to the target behavior of the machine learning model.

As an example, to train a machine learning model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), or may encompass another domain or domains, be they larger or smaller than a single language or subject domain. For example, a relatively large, multi-lingual, and non-subject-specific corpus can be created by extracting text from online webpages or publicly available social media posts. Training data can be annotated with ground truth labels (e.g., each data entry in the training dataset can be paired with a label) or may be unlabeled.

Training a machine learning model generally involves inputting into a machine learning model (e.g., an untrained machine learning model) training data to be processed by the machine learning model, processing the training data using the machine learning model, collecting the output generated by the machine learning model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding machine learning model input (e.g., in the case of an autoencoder), or can be a measure of some target observable effect on the environment (e.g., in the case of a reinforcement learning agent). The parameters of the machine learning model are updated based on a difference between the generated output value and the desired target value. For example, if the value outputted by the machine learning model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the machine learning model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during machine learning model training. For example, the training set may be first used to train one or more machine learning models, each machine learning model, e.g., having a particular architecture, having a particular training procedure, being describable by a set of model hyperparameters, or otherwise being varied from the other of the one or more machine learning models. The validation (or cross-validation) set may then be used as input data into the trained machine learning models to, e.g., measure the performance of the trained machine learning models or compare performance between them. Where hyperparameters are used, a new set of hyperparameters can be determined based on the measured performance of one or more of the trained machine learning models, and the first step of training (e.g., with the training set) may begin again on a different machine learning model described by the new set of determined hyperparameters. In this way, these steps can be repeated to produce a more performant trained machine learning model. Once such a trained machine learning model is obtained (e.g., after the hyperparameters have been adjusted to achieve a desired level of performance), a third step of collecting the output generated by the trained machine learning model applied to the third subset (the testing set) may begin. The output generated from the testing set may be compared with the corresponding desired target values to give a final assessment of the trained machine learning model's accuracy. Other segmentations of the larger data set or schemes for using the segments for training one or more machine learning models are possible.

Backpropagation is an algorithm for training a machine learning model. Backpropagation is used to adjust (e.g., update) the value of the parameters in the machine learning model with the goal of optimizing the objective function. For example, a defined loss function is calculated by forward propagation of an input to obtain an output of the machine learning model and a comparison of the output value with the target value. Backpropagation calculates a gradient of the loss function with respect to the parameters of the machine learning model, and a gradient algorithm (e.g., gradient descent) is used to update (e.g., "learn") the parameters to reduce the loss function. Backpropagation is performed iteratively so that the loss function is converged or minimized. Other techniques for learning the parameters of the machine learning model can be used. The process of updating (or learning) the parameters over many iterations is referred to as training. Training may be carried out iteratively until a convergence condition is met (e.g., a predefined maximum number of iterations has been performed, or the value outputted by the machine learning model is sufficiently converged with the desired target value), after which the machine learning model is considered to be sufficiently trained. The values of the learned parameters can then be fixed and the machine learning model may be deployed to generate output in real-world applications (also referred to as "inference").

In some examples, a trained machine learning model may be fine-tuned, meaning that the values of the learned parameters may be adjusted slightly in order for the machine learning model to better model a specific task. Fine-tuning of a machine learning model typically involves further training the machine learning model on a number of data samples (which may be smaller in number/cardinality than those used to train the model initially) that closely target the specific task. For example, a machine learning model for generating natural language, e.g., for alerts to operators, or commands that have been trained generically on publicly available text corpora may be, e.g., fine-tuned by further training using specific training samples. The specific training samples can be used to generate language in a certain style or in a certain format. For example, the machine learning model can be trained to generate a blog post having a particular style and structure with a given topic.

Some concepts in machine learning-based language models are now discussed. It may be noted that, while the term "language model" has been commonly used to refer to a machine learning-based language model, there could exist non-machine learning language models. In the present disclosure, the term "language model" can refer to a machine learning-based language model (e.g., a language model that is implemented using a neural network or other machine learning architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any machine learning-based language model, including language models based on other neural network architectures such as RNN-based language models.

FIG. 3 illustrates an example table 300 representing predicted oversubscription periods for APIs, in accordance with one or more embodiments of this disclosure. In particular, table 300 may represent an output generated by the machine learning subsystem 164 trained to predict one or more time periods when a corresponding usage rate for one or more APIs is predicted to exceed a corresponding rate limit. The API monitoring system 160 may input usage monitoring data into the machine learning subsystem 164 to obtain the predicted time periods. By inputting usage monitoring data into the machine learning model (e.g., the machine learning subsystem 164) and obtaining predicted time periods of high API demand, the API monitoring system 160 may take proactive measures to ensure efficient resource distribution and maintain API performance. The embodiments described in relation to table 300 may allow for predictive resource management by identifying potential API oversubscription events before oversubscription occurs.

In some embodiments, table 300 may contain three fields (e.g., field 303, field 306, and field 309). Field 303 may include an API identifier ("API_ID") such as A001 or A002. The API_ID in field 303 may include identifiers associated with APIs for which the machine learning subsystem 164 has predicted an oversubscription event. Field 306 may include a predicted time period ("Predicted Time") such as Sunday 8 PM-11 PM or Monday 5 PM-10 PM. The Predicted Time in field 306 may indicate the time period during which the machine learning model predicts the API will exceed its rate limit based on usage data (e.g., historical) and trained patterns. Field 309 may include a corresponding usage rate ("Rate"). The Rate in field 309 may specify the predicted request rate for the API during the identified time period.

In some embodiments, the API monitoring system 160 may receive, for a plurality of APIs, usage monitoring data including timing data and access metrics. The machine learning subsystem 164 may analyze this data to determine patterns of API usage and identify periods of increased demand. The API monitoring system 160 may input the usage monitoring data into a machine learning model to obtain one or more time periods when a corresponding usage rate for one or more APIs is predicted to exceed the corresponding rate limit, indicating the machine learning model has been trained, using training data, to predict time periods when usage rates exceed rate limits.

For example, table 300 may show that API A001 is predicted to exceed the rate limit (e.g., 1000 requests per second) during Sunday 8 PM-11 PM, with an expected request rate of 2000 requests per second. Similarly, API A002 may be predicted to exceed the rate limit during Monday 5 PM-10 PM, with an expected request rate of 1500 requests per second. The API monitoring system 160 may utilize these predictions to proactively adjust resource allocations or modify rate limits to prevent service disruptions. The limit identification subsystem 166 may be configured to determine that the predicted oversubscription events are evaluated against the correct rate limits for each API. The data represented in table 300 may be dynamically updated as the machine learning subsystem 164 processes new usage monitoring data. In some embodiments, the machine learning subsystem 164 may continue refining predictions based on additional data inputs and may incorporate adjustments to improve accuracy.

FIG. 4 illustrates an example table 400 representing resource allocation data for APIs, in accordance with one or more embodiments of this disclosure. In particular, table 400 may illustrate resource distribution for a subset of APIs, including memory, processor, and network bandwidth allocations. The API monitoring system 160 may retrieve such resource allocation data to determine whether an API is oversubscribed and whether one or more undersubscribed APIs may provide resources to mitigate the oversubscription event.

Table 400 may contain four fields (e.g., field 403, field 406, field 409, and field 411). Field 403 may include an API identifier ("API_ID") such as A001, A002, or A003. The API_ID in field 403 may correspond to APIs being monitored for resource consumption and allocation. Field 406 may include memory allocation data ("Memory (MB)"), which may specify the amount of memory allocated to each API. Field 409 may include processor allocation data ("Processor (GHz)"), which may indicate the amount of processing power assigned to each API. Field 411 may include network bandwidth allocation data ("Network (Mbps)"), which may indicate the network resources allocated to each API.

In some embodiments, the API monitoring system 160 may determine that a matching time period has been output by the machine learning subsystem 164 for a subset of oversubscribed APIs. Based on determining that the matching time period has been output by the machine learning subsystem 164 for the subset of oversubscribed APIs, the API monitoring system 160 may retrieve resource allocation data from a plurality of APIs, as represented in table 400. The limit identification subsystem 166 may provide baseline resource limits for each API, ensuring that the retrieved resource allocation data is evaluated against predefined constraints.

For example, table 400 may show that API A001 has been allocated 8000 MB of memory, 3.5 GHz of processing power, and 1000 Mbps of network bandwidth. In contrast, API A002 and API A003 may have lower resource allocations, with API A002 allocated 4000 MB of memory, 2.0 GHz of processing power, and 500 Mbps of network bandwidth, and API A003 allocated 2000 MB of memory, 1.5 GHz of processing power, and 300 Mbps of network bandwidth. The API monitoring system 160 may determine that API A001 is oversubscribed, and API A002 and API A003 are undersubscribed.

In some embodiments, the API monitoring system 160 may determine, based on the resource allocation data, one or more undersubscribed APIs from which resources may be reallocated for the subset of oversubscribed APIs. For example, based on the resource allocation data in table 400, the API monitoring system 160 may determine, using the resource adjustment subsystem 168, whether memory in field 406, processor in field 409, or network resources in field 411 may be reallocated from API A002 or API A003 to API A001. In some embodiments, the API monitoring system 160 may adjust the resource limits dynamically or notify an operator for manual intervention. The machine learning subsystem 164 may continue to monitor updated resource allocation data and refine predictions to improve resource reallocation strategies over time.

The embodiments described in relation to table 400 may allow for predictive resource reallocation by identifying oversubscribed APIs, retrieving resource allocation data, and determining undersubscribed APIs capable of resource redistribution. By leveraging the machine learning subsystem 164, the limit identification subsystem 166, and the resource adjustment subsystem 168, the API monitoring system 160 may distribute resource allocation accordingly and prevent API performance degradation.

FIG. 5 illustrates an example table 500 representing resource reallocation and rate limit adjustments for APIs, in accordance with one or more embodiments of this disclosure. Table 500 may represent data utilized by the API monitoring system 160 to dynamically adjust resource allocations and rate limits for one or more APIs based on predicted oversubscription events. The API monitoring system 160 may determine, based on the output of the machine learning subsystem 164, that certain APIs are oversubscribed, while others are undersubscribed, and may adjust resource distribution accordingly. In particular, the API monitoring system 160 may reallocate, for the matching time period, the resources to the subset of oversubscribed APIs. The reallocation of resources may be performed for a matching time period determined by the machine learning subsystem 164, which may predict when a subset of APIs will exceed the corresponding rate limits. In some embodiments, the machine learning subsystem 164 may be trained to determine an amount of resources needed to increase each corresponding rate limit for the subset of oversubscribed APIs to accommodate a corresponding predicted rate. The machine learning subsystem 164 may be trained to lower the corresponding rate limits for the matching time period on the one or more undersubscribed APIs in accordance with reallocated resources.

For example, table 500 may include six fields (e.g., API_ID, Resource Type, Previous Allocation, Updated Allocation, Previous Rate Limit, and Updated Rate Limit). The fields may include data that can be used to configure the API monitoring system 160 to manage API resources dynamically in response to projected demand fluctuations, such as oversubscription and undersubscription.

API_ID in field 503 may include unique identifiers associated with APIs undergoing resource reallocation. For example, table 500 may include APIs A001, A002, and A003. The resource type in field 506 may indicate the type of resource being adjusted, such as memory (MB), processor (GHz), or network (Mbps).

The previous allocation in field 509 may indicate the resource allocation assigned to the API before the reallocation process, while the updated allocation in field 511 field may represent the adjusted resource allocation after redistribution to the oversubscribed API. Similarly, the previous rate limit in field 513 may indicate the API's request rate limit before adjustments, and the updated rate limit in field

515 may represent the new rate limit following resource reallocation from the undersubscribed APIs to the oversubscribed API.

For example, as shown in table 500, API A001 may be identified as an oversubscribed API, requiring additional memory, processing power, and network bandwidth. The API monitoring system 160 may determine that API A001's memory allocation should be increased from 8000 MB to 10,000 MB, its processor allocation should be increased from 3.5 GHz to 4.0 GHz, and its network bandwidth should be increased from 1000 Mbps to 1200 Mbps. Additionally, API A001's rate limit may be increased from 2000 requests per second to 2500 requests per second, based on predicted usage. The API monitoring system 160 may increase corresponding rate limits for the subset of oversubscribed APIs in accordance with the corresponding usage rate during the matching time period. To determine the corresponding amount of resources needed to increase each corresponding rate limit for the subset of oversubscribed APIs, the API monitoring system 160 may analyze historical and usage monitoring data. The API monitoring system 160 may determine, for each API, the corresponding difference between its predicted usage rate and its current resource allocation and, based on this difference, determine the additional resources necessary to accommodate the corresponding predicted rate. The API monitoring system 160 may further adjust resource allocations accordingly to allow API performance to remain stable during periods of increased demand.

Conversely, APIs A002 and A003 may be identified as undersubscribed APIs with excess resource capacity. The API monitoring system 160 may determine that memory resources allocated to API A002 should be decreased from 4000 MB to 3000 MB, and the API A003 memory allocation should be decreased from 2000 MB to 1000 MB. The resource adjustments may allow for the API monitoring system 160 performance to continue without degradation while relocating resource availability for APIs with greater demand (e.g., oversubscription) from APIs with less demand (e.g., undersubscription). To identify the undersubscribed APIs for resource reallocation, the API monitoring system 160 may determine, for the matching time period, the corresponding usage rates for each API of the plurality of APIs. The API monitoring system 160 may then generate a corresponding usage difference between each API's usage limit and the corresponding usage rate. Based on the usage differences, the API monitoring system 160 may identify one or more APIs that are operating below the assigned resource capacities and determine that the APIs' excess resources may be unallocated and reallocated to oversubscribed APIs. The API monitoring system 160 ensures that resources are efficiently redistributed without impacting the performance of undersubscribed APIs.

In some embodiments, to determine the amount of resources needed to increase each corresponding rate limit for the subset of oversubscribed APIs, the API monitoring system 160 may determine, for each API of the subset of oversubscribed APIs, a corresponding plurality of usage rates and a corresponding resource usage for each usage rate. The API monitoring system 160 may further generate, for each API, a corresponding usage difference between a corresponding usage limit and the corresponding usage rate for the matching time period. This usage difference may be used to assess the exact resource requirements needed to accommodate the predicted demand efficiently. Based on the corresponding usage difference, the API monitoring system 160 may determine, for each API of the subset of oversubscribed APIs, a corresponding amount of additional resources needed to prevent degradation during the matching time period.

In some embodiments, processor and network resources are not adjusted for A002 and A003 (e.g., as seen in FIG. 5), as the undersubscribed APIs may primarily contribute memory resources for reallocation. However, if the machine learning model predicts a network or processing underutilization for these APIs, the API monitoring system 160 may adjust those resources accordingly.

By dynamically adjusting resource allocations and rate limits in response to predicted oversubscription, the API monitoring system 160 may optimize API performance, prevent failures due to overloading, and ensure equitable resource distribution across the system.

Figure 6:
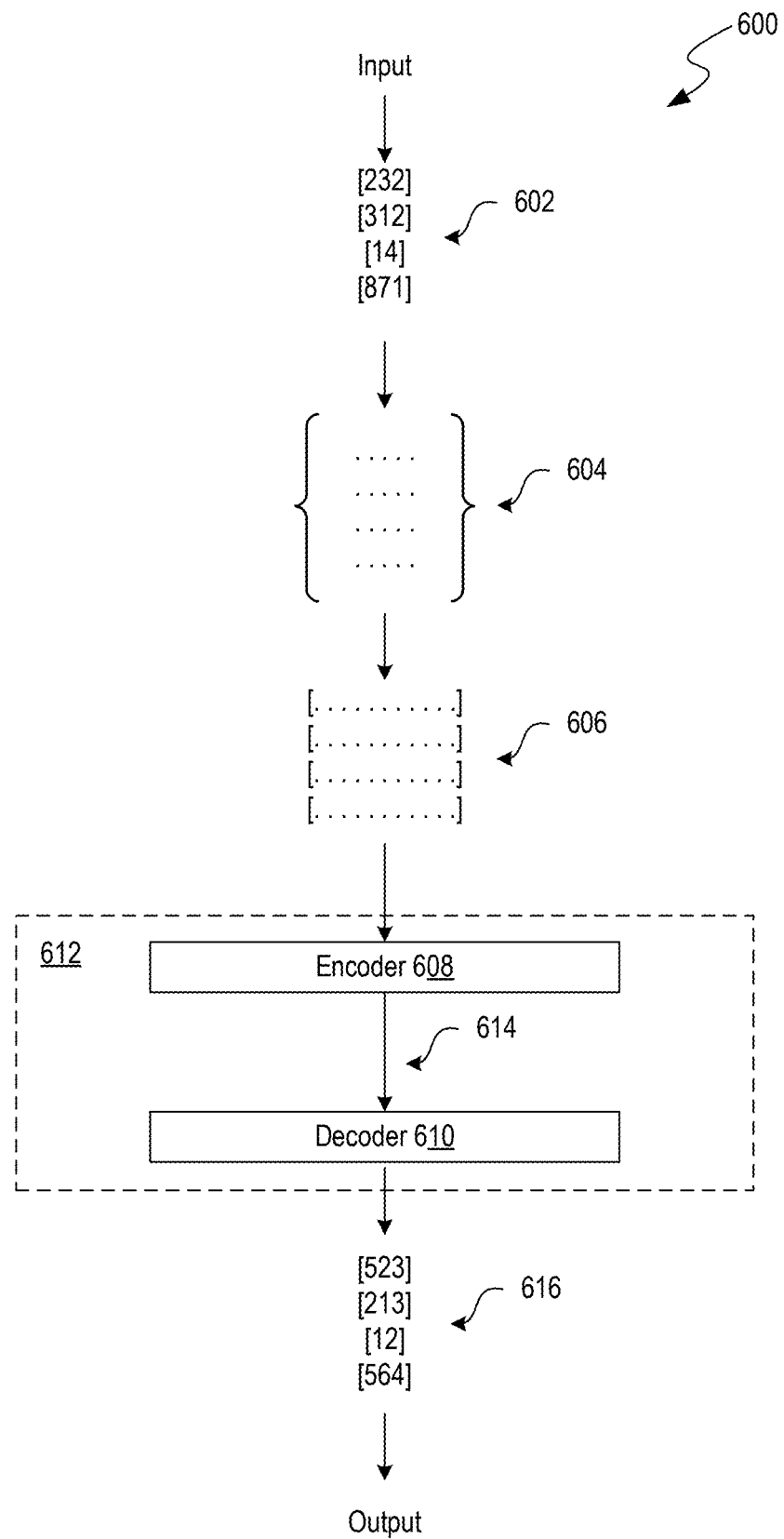
FIG. 6 is a block diagram of an example transformer used to monitor and predict oversubscription events, in accordance with one or more embodiments of this disclosure.

FIG. 6 is a block diagram 600 of an example transformer 612 used to monitor and predict oversubscription events, in accordance with one or more embodiments of this disclosure. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any machine learning-based language model, including language models based on other neural network architectures such as RNN-based language models.

The transformer 612 includes an encoder 608 (which can include one or more encoder layers/blocks connected in series) and a decoder 610 (which can include one or more decoder layers/blocks connected in series). Generally, the encoder 608 and the decoder 610 each include multiple neural network layers, at least one of which can be a self-attention layer. The parameters of the neural network layers can be referred to as the parameters of the language model.

The transformer 612 can be trained to perform certain functions on a natural language input. Examples of the functions include summarizing existing content, brainstorming ideas, writing a rough draft, fixing spelling and grammar, and translating content. Summarizing can include extracting key points or themes from existing content in a high-level summary. Brainstorming ideas can include generating a list of ideas based on provided input. For example, the machine learning model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 612 is trained to perform certain functions on other input formats than natural language input. For example, the input can include objects, images, audio content, or video content, or a combination thereof.

As described herein, such a model may be used in order to generate commands, e.g., such as those to effectuate operations for monitoring and testing at tool-based monitoring systems, as well as for potentially transmitting data from those operations to the system.

The transformer 612 can be trained on a text corpus that is labeled (e.g., annotated to indicate verbs, nouns) or unlabeled. LLMs can be trained on a large unlabeled corpus. The term "language model," as used herein, can include a machine learning-based language model (e.g., a language model that is implemented using a neural network or other machine learning architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 6 illustrates an example 600 of how the transformer 612 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

As shown in the example 600, a short sequence of tokens 602 corresponding to the input text is illustrated as input to the transformer 612. Tokenization of the text sequence into the tokens 602 can be performed by some pre-processing tokenization module such as, for example, a byte-pair encoding tokenizer (the "pre" referring to the tokenization occurring prior to the processing of the tokenized input by the LLM), which is not shown in FIG. 6 for brevity. In general, the token sequence that is inputted to the transformer 612 can be of any length up to a maximum length defined based on the dimensions of the transformer 612. Each token 602 in the token sequence is converted into an embedding 606 (also referred to as "embedding vector").

An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space can be defined by the dimensions and values of the embedding vectors. Various techniques can be used to convert a token 602 to an embedding 606. For example, another trained machine learning model can be used to convert the token 602 into an embedding 606. In particular, another trained machine learning model can be used to convert the token 602 into an embedding 606 in a way that encodes additional information into the embedding 606 (e.g., a trained machine learning model can encode positional information about the position of the token 602 in the text sequence into the embedding 606). In some implementations, the numerical value of the token 602 can be used to look up the corresponding embedding in an embedding matrix 604, which can be learned during training of the transformer 612.

The generated embeddings, e.g., such as the embedding 606, are input into the encoder 608. The encoder 608 serves to encode the embedding 606 into feature vectors 614 that represent the latent features of the embedding 606. The encoder 608 can encode positional information (i.e., information about the sequence of the input) in the feature vectors 614. The feature vectors 614 can have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as the feature vectors 614 that can be generated by the encoder 608 can be referred to as a latent space or feature space.

Conceptually, the decoder 610 is designed to map the features represented by the feature vectors 614 into meaningful output, which can depend on the task that was assigned to the transformer 612. For example, if the transformer 612 is used for a translation task, the decoder 610 can map the feature vectors 614 into text output in a target language different from the language of the original tokens 602. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 can generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some implementations, the input provided to the transformer 612 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive or can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

Figure 7:
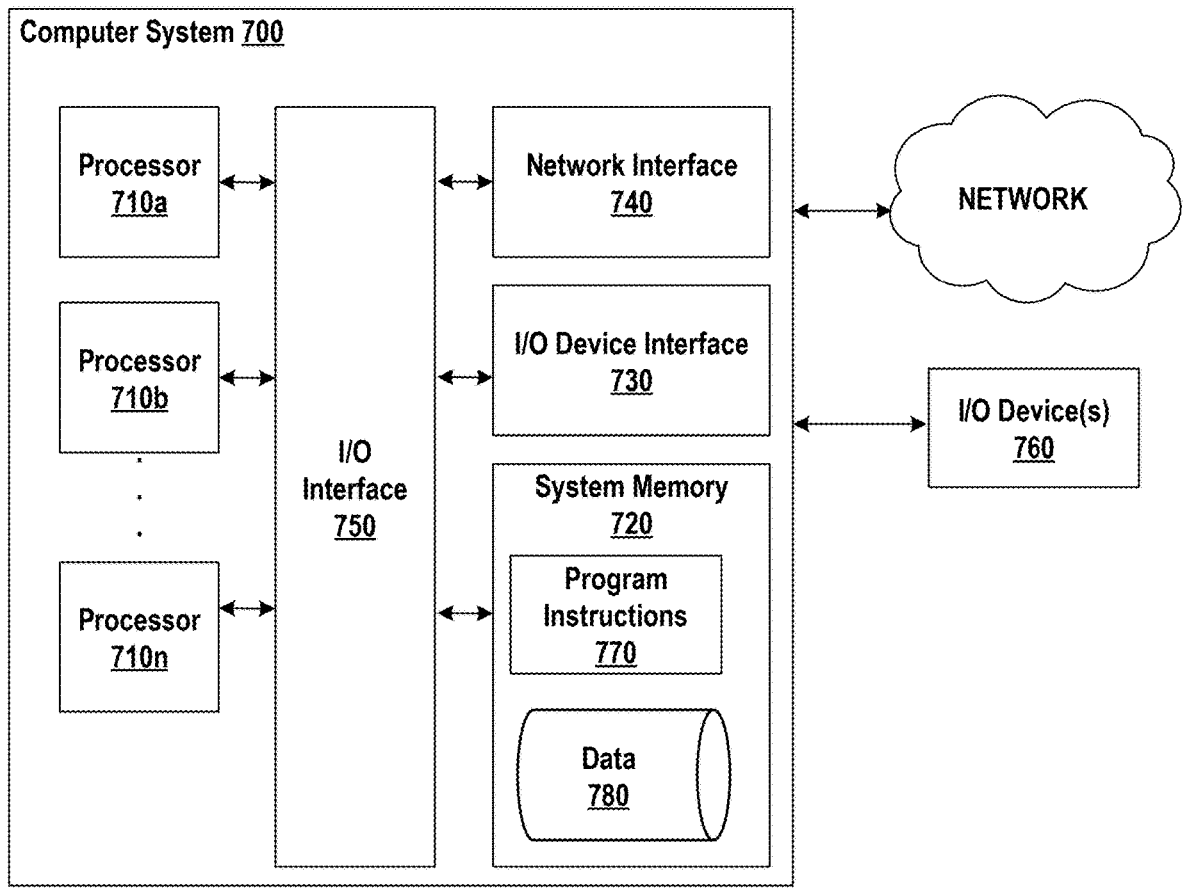
FIG. 7 illustrates an example computing system that may be used in accordance with some embodiments of this disclosure.

FIG. 7 shows an example computing system that may be used in accordance with some embodiments of this disclosure. In some instances, computing system 700 is referred to as a computer system 700. A person skilled in the art would understand that those terms may be used interchangeably. The components of FIG. 7 may be used to perform some or all operations discussed in relation to FIGS. 1-6. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output (I/O) device interface 730, and a network interface 740 via an I/O interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 700. A processor may execute code (e.g., processor firmware, a protocol stack, a database management system, an operating system, or a combination thereof) that creates an execution environment for program instructions.

A processor may include a programmable processor. A processor may include general or special purpose microprocessors. A processor may receive instructions and data from a memory (e.g., system memory 720). Computing system 700 may be a uni-processor system including one processor (e.g., processor 710a), or a multiprocessor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer systems, for example, may be connected to computer system 700 via a network and network interface 740.

The I/O device interface 730 and I/O devices 760 may be used to enable manipulation of the three-dimensional model as well. For example, the user may be able to use I/O devices such as a keyboard and touchpad to indicate specific selections for nodes, adjust values for nodes, select from the history of machine learning models, select specific inputs or outputs, or the like. Alternatively or additionally, the user may use their voice to indicate specific nodes, specific models, or the like via the voice recognition device or microphones.

Network interface 740 may include a network adapter that provides for connection of computer system 700 to a network. Network interface 740 may facilitate data exchange between computer system 700 and other devices connected to the network. Network interface 740 may support wired or wireless communication. The network may include an electronic communication network, such as the internet, a LAN, a WAN, a cellular communications network, or the like.

System memory 720 may be configured to store program instructions 770 or data 780. Program instructions 770 may be executable by a processor (e.g., one or more of processors 710a-710n) to implement one or more embodiments of the present techniques. Program instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory, computer-readable storage medium. A non-transitory, computer-readable storage medium may include nonvolatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM or DVD-ROM, hard drives), or the like. System memory 720 may include a non-transitory, computer-readable storage medium that may have program instructions stored thereon that are executable by a computer processor (e.g., one or more of processors 710a-710n) to cause the subject matter and the functional operations described herein. A memory (e.g., system memory 720) may include a single memory device or a plurality of memory devices (e.g., distributed memory devices).

I/O interface 750 may be configured to coordinate I/O traffic between processors 710a-710n, system memory 720, network interface 740, I/O devices 760, or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700 or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 700 may also be connected to other devices that are not illustrated or may operate as a stand-alone system. In addition, the functionality provided by the illustrated components may, in some embodiments, be combined in fewer components, or be distributed in additional components. Similarly, in some embodiments, the functionality of some of the illustrated components may not be provided, or other additional functionality may be available.

Figure 8:
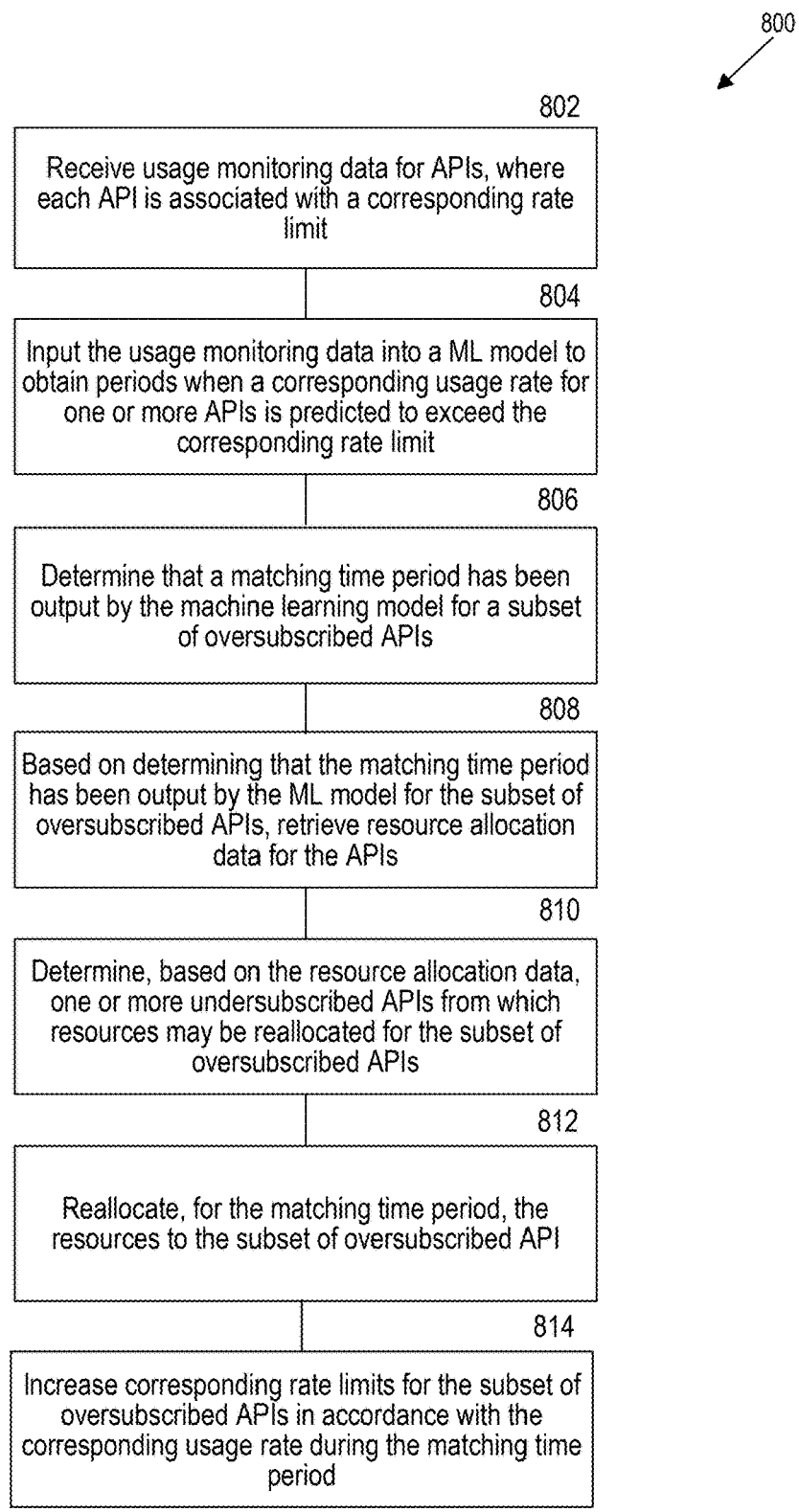
FIG. 8 is a flowchart of operations for monitoring, predicting, and mitigating API oversubscription events, in accordance with one or more embodiments of this disclosure.

FIG. 8 is a flowchart 800 of operations for monitoring, predicting, and mitigating API oversubscription events, in accordance with one or more embodiments of this disclosure. The operations of FIG. 8 may use components described in relation to FIG. 7. In some embodiments, the API monitoring system 160 may include one or more components of computer system 700.

At operation 802, one or more of processors 710a-710n may receive usage monitoring data for APIs, where each API is associated with a corresponding rate limit. The usage monitoring data may include metrics such as API request rates, data sizes, and access timing information. As described herein, the data may be obtained as a result of commands generated and transmitted via one or more of processors 710a-710n. One or more of processors 710a-710n may receive the data over the communication network 140 using network interface 740.

At operation 804, one or more of processors 710a-710n may input the usage monitoring data into a machine learning model to obtain periods when a corresponding usage rate for one or more APIs is predicted to exceed the corresponding rate limit. According to some examples, as described herein, the API monitoring machine learning model may be trained using historical API usage patterns to identify and/or predict time periods of high demand that may result in oversubscription events.

At operation 806, one or more of processors 710a-710n may determine that a matching time period has been output by the machine learning model for a subset of oversubscribed APIs. In some examples, the matching time period may indicate that a predicted API usage rate will exceed its assigned rate limit, which may require intervention to prevent service degradation from API resource usage.

At operation 808, one or more of processors 710a-710n may retrieve resource allocation data for the APIs based on determining that the matching time period has been output by the machine learning model for the subset of oversubscribed APIs. The resource allocation data may include details on memory usage, processing power, and network bandwidth assigned to each API. For example, the additional parameters may be obtained as a result of the one or more second prompts (e.g., based on inputting the one or more second prompts).

At operation 810, one or more of processors 710a-710n may determine, based on the resource allocation data, one or more undersubscribed APIs from which resources may be reallocated for the subset of oversubscribed APIs. At operation 810, one or more of processors 710a-710n, based on the updated resource allocation data indicating the oversubscription event of one or more APIs in the network system. For example, the operator device 150 may receive an alert and in some examples, may be enabled to respond or cause further action to fix the oversubscription event.

At operation 812, one or more of processors 710a-710n may reallocate, for the matching time period, the resources to the subset of oversubscribed APIs. This may involve adjusting memory, processing power, or network bandwidth allocations to balance demand across the system. For example, the one or more of processors 710a-710n may determine a total amount of resources required for the subset of oversubscribed APIs and compare it against available resources from undersubscribed APIs. Based on this, the system may lower the rate limits for undersubscribed APIs in accordance with the reallocated resources to maintain system stability.

At operation 814, one or more of processors 710a-710n may increase the corresponding rate limits for the subset of oversubscribed APIs in accordance with the corresponding usage rate during the matching time period. The updated rate limits may be dynamically applied to allow for higher request capacity while ensuring efficient API performance. For example, the one or more of processors 710a-710n may determine the amount of resources needed to increase each corresponding rate limit by analyzing historical usage patterns and current resource availability. Based on this determination, the one or more of processors 710a-710n may allocate additional memory, processing power, or network bandwidth to accommodate the corresponding predicted rate for each API.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology not only may include additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (*f*). Accordingly, the applicant reserves the right to pursue additional claims after filing this application to pursue such additional claim forms, either in this application or in a continuing application.

What is claimed is:

1. A system for application programming interface monitoring, the system comprising:
   one or more processors; and
   one or more non-transitory computer-readable media comprising instructions that, when executed by the one or more processors, cause operations comprising:
     receiving, for a plurality of application programming interfaces, usage monitoring data, wherein each application programming interface of the plurality of application programming interfaces is associated with a corresponding rate limit, and wherein the usage monitoring data comprises timing data and access metrics for the plurality of application programming interfaces;
     inputting the usage monitoring data into a machine learning model to obtain one or more time periods when a corresponding usage rate for one or more application programming interfaces is predicted to exceed the corresponding rate limit, wherein the machine learning model has been trained, using training data, to predict time periods when usage rates exceed rate limits;
     determining that a matching time period has been output by the machine learning model for a subset of oversubscribed application programming interfaces, wherein the matching time period indicates that the subset of oversubscribed application programming interfaces are each predicted to exceed the corresponding rate limit;
     based on determining that the matching time period has been output by the machine learning model for the subset of oversubscribed application programming interfaces, retrieving resource allocation data for the plurality of application programming interfaces, wherein the resource allocation data comprises allocation data for one or more of processing resources, memory resources, or network resources;
     determining, based on the resource allocation data, one or more undersubscribed application programming interfaces from which resources may be reallocated for the subset of oversubscribed application programming interfaces;
     reallocating the resources to the subset of oversubscribed application programming interfaces by decreasing the rate limits for the one or more undersubscribed application programming interfaces for the matching time period; and
     updating corresponding rate limits for the subset of oversubscribed application programming interfaces to increase the corresponding rate limits.

2. The system of claim 1, wherein the instructions further cause the one or more processors to perform operations comprising:
   inputting the matching time period and the usage monitoring data into an explainability model with a first prompt to identify a subset of the usage monitoring data that affects a prediction of the matching time period, wherein the usage monitoring data comprises one or more of processor usage, memory, usage, or network usage;
   inputting the subset of the usage monitoring data into a large language model with a second prompt to generate a natural language output indicating a reason for the subset of oversubscribed application programming interfaces; and
   generating for display the natural language output.

3. The system of claim 2, wherein the explainability model has been trained to predict for each usage rate input into the explainability model a subset of fields of the usage monitoring data that best predict the corresponding usage rate.

4. The system of claim 1, wherein the instructions further cause the one or more processors to determine an amount of resources needed to increase each corresponding rate limit for the subset of oversubscribed application programming interfaces to accommodate a corresponding predicted rate.

5. The system of claim 4, wherein the instructions for determining the amount of resources needed to increase each corresponding rate limit for the subset of oversubscribed application programming interfaces to accommodate the corresponding predicted rate, further cause the one or more processors to perform operations comprising:
   determining, for each application programming interface of the subset of oversubscribed application programming interfaces, a corresponding plurality of usage rates and a corresponding resource usage for each usage rate;
   generating, for each application programming interface of the plurality of application programming interfaces, a corresponding usage difference between a corresponding usage limit and the corresponding usage rate for the matching time period; and determining, for each application programming interface of the subset of oversubscribed application programming interfaces based on the corresponding usage difference, a corresponding amount of resources.

6. The system of claim 5, wherein the instructions for determining the one or more undersubscribed application programming interfaces from which the amount of resources may be reallocated further cause the one or more processors to perform operations including:

determining, based on each corresponding amount of resources, a total amount of resources required for the subset of oversubscribed application programming interfaces;

determining, for the matching time period, corresponding usage rates for each application programming interface of the plurality of application programming interfaces;

generating, each for the plurality of application programming interfaces, the corresponding usage difference between each usage limit and the corresponding usage rate for the matching time period; and identifying, based on each corresponding usage difference, the one or more undersubscribed application programming interfaces from which the resources may be unallocated.

7. The system of claim 4, wherein the instructions further cause the one or more processors to lower the corresponding rate limits for the matching time period on the one or more undersubscribed application programming interfaces in accordance with reallocated resources.

8. The system of claim 1, wherein the instructions further cause the one or more processors to determine a corresponding amount of resources needed to increase each corresponding rate limit for the subset of oversubscribed application programming interfaces to accommodate a corresponding predicted rate.

9. A method for application programming interface monitoring, the method comprising:

receiving, for a plurality of application programming interfaces, usage monitoring data, wherein each application programming interface of the plurality of application programming interfaces is associated with a corresponding rate limit;

inputting the usage monitoring data into a machine learning model to obtain one or more time periods when a corresponding usage rate for one or more application programming interfaces is predicted to exceed the corresponding rate limit;

determining that a matching time period has been output by the machine learning model for a subset of oversubscribed application programming interfaces;

based on determining that the matching time period has been output by the machine learning model for the subset of oversubscribed application programming interfaces, retrieving resource allocation data for the plurality of application programming interfaces;

determining, based on the resource allocation data, one or more undersubscribed application programming interfaces from which resources may be reallocated for the subset of oversubscribed application programming interfaces;

reallocating, for the matching time period, the resources to the subset of oversubscribed application programming interfaces; and increasing corresponding rate limits for the subset of oversubscribed application programming interfaces in accordance with the corresponding usage rate during the matching time period.

10. The method of claim 9, further comprising:

inputting the matching time period and the usage monitoring data into an explainability model with a first prompt to identify a subset of the usage monitoring data that affects a prediction of the matching time period, wherein the usage monitoring data comprises one or more of processor usage, memory, usage, or network usage;

inputting the subset of the usage monitoring data into a large language model with a second prompt to generate a natural language output indicating a reason for the subset of oversubscribed application programming interfaces; and generating for display the natural language output.

11. The method of claim 10, wherein the explainability model has been trained to predict for each usage rate input into the explainability model a subset of fields of the usage monitoring data that best predict the corresponding usage rate.

12. The method of claim 9, further comprising determining an amount of resources needed to increase each corresponding rate limit for the subset of oversubscribed application programming interfaces to accommodate a corresponding predicted rate.

13. The method of claim 12, wherein determining the amount of resources needed to increase each corresponding rate limit for the subset of oversubscribed application programming interfaces to accommodate the corresponding predicted rate further comprises:

determining, for each application programming interface of the subset of oversubscribed application programming interfaces, a corresponding plurality of usage rates and a corresponding resource usage for each usage rate;

generating, for each application programming interface of the plurality of application programming interfaces, a corresponding usage difference between a corresponding usage limit and the corresponding usage rate for the matching time period; and determining, for each application programming interface of the subset of oversubscribed application programming interfaces based on the corresponding usage difference, a corresponding amount of resources.

14. The method of claim 13, wherein determining the one or more undersubscribed application programming interfaces from which the amount of resources may be reallocated further comprises:

determining, based on each corresponding amount of resources, a total amount of resources required for the subset of oversubscribed application programming interfaces;

determining, for the matching time period, corresponding usage rates for each application programming interface of the plurality of application programming interfaces;

generating, for each application programming interface of the plurality of application programming interfaces, the corresponding usage difference between each usage limit and the corresponding usage rate for the matching time period; and identifying, based on each corresponding usage difference, the one or more undersubscribed application programming interfaces from which the resources may be unallocated.

15. The method of claim 12, further comprising lowering the corresponding rate limits for the matching time period on the one or more undersubscribed application programming interfaces in accordance with reallocated resources.

16. The method of claim 9, further comprising determining a corresponding amount of resources needed to increase each corresponding rate limit for the subset of oversubscribed application programming interfaces to accommodate a corresponding predicted rate.

17. One or more non-transitory computer-readable media comprising instructions recorded thereon that, when executed by one or more processors, cause operations for monitoring application programming interfaces at a network system, comprising:
   receiving, for a plurality of application programming interfaces, usage monitoring data, wherein each application programming interface of the plurality of application programming interfaces is associated with a corresponding rate limit;
   inputting the usage monitoring data into a machine learning model to obtain a subset of oversubscribed application programming interfaces and one or more time periods when a corresponding usage rate for the subset of oversubscribed application programming interfaces is predicted to exceed the corresponding rate limit;
   determining that a matching time period has been output by the machine learning model for the subset of oversubscribed application programming interfaces;
   based on determining that the matching time period has been output by the machine learning model for the subset of oversubscribed application programming interfaces, retrieving resource allocation data for the plurality of application programming interfaces;
   determining, based on the resource allocation data, one or more undersubscribed application programming interfaces from which resources may be reallocated for the subset of oversubscribed application programming interfaces;
   decreasing each corresponding rate limit for the one or more undersubscribed application programming interfaces for the matching time period in accordance with the resource allocation data; and
   increasing corresponding rate limits for the subset of oversubscribed application programming interfaces in accordance with the corresponding usage rate during the matching time period.

18. The one or more non-transitory computer-readable media of claim 17, wherein the instructions further cause the one or more processors to perform operations comprising:
   inputting the one or more time periods and the usage monitoring data into an explainability model with a first prompt to identify a subset of the usage monitoring data that affects a prediction of the one or more time periods, wherein the usage monitoring data comprises one or more of processor usage, memory, usage, or network usage;
   generating for display one or more indications of the subset of the usage monitoring data that affects the prediction of the one or more time periods;
   inputting the subset of the usage monitoring data into a large language model with a second prompt to generate a natural language output indicating a reason for the subset of oversubscribed application programming interfaces; and
   generating for display the natural language output.

19. The one or more non-transitory computer-readable media of claim 17, wherein the instructions further cause the one or more processors to lower the corresponding rate limits for the matching time period on the one or more undersubscribed application programming interfaces in accordance with reallocated resources.

* * * * *